United States Patent
Amirzadeh-Asl et al.

(10) Patent No.: US 7,776,149 B2
(45) Date of Patent: Aug. 17, 2010

(54) BARIUM SULFATE, PROCESS FOR ITS PREPARATION, AND ITS USE

(75) Inventors: Djamschid Amirzadeh-Asl, Moers (DE); Karl-Heinz Schwarz, Rheinberg (DE)

(73) Assignee: Sachtleben Chemie GmbH, Duisburg (DE)

( * ) Notice: Subject to any disclaimer, the term of this patent is extended or adjusted under 35 U.S.C. 154(b) by 100 days.

(21) Appl. No.: 11/867,361

(22) Filed: Oct. 4, 2007

(65) Prior Publication Data

US 2008/0268149 A1     Oct. 30, 2008

Related U.S. Application Data

(63) Continuation of application No. 10/787,567, filed on Feb. 26, 2004, now abandoned, which is a continuation of application No. 10/182,592, filed as application No. PCT/EP01/00453 on Jan. 17, 2001, now abandoned.

(30) Foreign Application Priority Data

Feb. 2, 2000   (DE) ................. 100 05 685

(51) Int. Cl.
   C09C 1/02    (2006.01)
   C01F 11/46   (2006.01)

(52) U.S. Cl. ............... 106/471; 428/403; 428/407; 524/423; 427/212; 427/215; 427/220; 427/213.3

(58) Field of Classification Search ........... 423/554; 106/471; 428/403, 407; 427/212, 215, 220, 427/213.3; 524/423
   See application file for complete search history.

(56) References Cited

U.S. PATENT DOCUMENTS

| | | | | |
|---|---|---|---|---|
| 2,006,216 A | * | 6/1935 | MacArthur et al. | 510/259 |
| 2,006,219 A | * | 6/1935 | McQuaid | 423/554 |
| 2,125,342 A | * | 8/1938 | Steinbring et al. | 423/554 |
| 3,436,241 A | * | 4/1969 | Durrant | 106/499 |
| 3,669,896 A | * | 6/1972 | Preininger et al. | 252/301.21 |
| 3,803,065 A | * | 4/1974 | Arai et al. | 523/205 |

* cited by examiner

*Primary Examiner*—C. Melissa Koslow
(74) *Attorney, Agent, or Firm*—Fulbright & Jaworski L.L.P

(57) ABSTRACT

Barium sulfate particles having an average particle diameter $d_{50}$ of from 0.1 to 10 μm which are produced by precipitation can be dispersed better if they are covered with at least one organic additive.

20 Claims, No Drawings

BARIUM SULFATE, PROCESS FOR ITS PREPARATION, AND ITS USE

This application is a continuation application of U.S. Ser. No. 10/787,567filed Feb. 26, 2004 (now abandoned), which is a continuation. of U.S. Ser. No. 10/182,592filed Mar. 12, 2003 (now abandoned) which is a §371 of PCT/EP01/00453 filed Jan. 17, 2001, which claimed priority from German Patent Application No. 10 005 685.7 filed Feb. 2, 2000.

This invention relates to barium sulfate having an average particle diameter $d_{50}$ of from 0.1 to 10 μm and precipitated by mixing of barium- or of sulfate-containing solution, a process for its preparation and its use.

Such barium sulfate is used in particular in the production of photographic paper, paints and plastics as well as in medical diagnosis and in medical plastics. For use in the medical field, in addition to the high standards as regards purity, there are also legal requirements for pharmaceutical products which have to be complied with. Barium sulfate is a high-quality, pure white, inert, acid- and alkali-resistant filler which is completely weather-resistant.

Very finely-divided barium sulfate imparts colour stability and gloss to photographic paper. When used in paints, the very finely-divided barium sulfate produces resistance to flocculation in organic and inorganic pigments, so that segregation phenomena are largely prevented, depth of colour and purity of colour are increased and brightness and fogging are improved. Moreover, the mechanical properties of the plastics are improved as a result of the nucleating action of the barium sulfate powder.

In stretched films made from thermoplastics, in particular polymers containing incorporated very finely-divided barium sulfate, the latter acts as a white pigment, scattering light at the boundaries of the barium sulfate particles to the air, so that the films have an opaque colouring and a high gloss. A suitable thermoplastic is, in particular polyester, in which glycol suspension containing barium sulfate has been incorporated, generally during the polycondensation.

Here an adequate dispersion of the barium sulfate particles in the polyester is an essential precondition for opacity and high gloss in the stretched films. In the event of inadequate dispersion of the barium sulfate particles in the polymer, specks—these are agglomerates of barium sulfate particles— are formed after the stretching process and these can considerably impair the quality of the film surface.

DE-A 26 47 713 describes an opaque, simple thermoplastic film support made of a molecularly oriented film of a synthetic, linear polyester, in which 5 to 50 wt. %, based on the weight of the polyester, of barium sulfate particles having an average particle size of from 0.5 to 10 μm is dispersed, with the proviso that the actual particle size of 99.9% of the particles does not exceed 50 μm and that at least one light-sensitive image layer is disposed on at least one surface of the film support.

These film supports are highly impermeable to moisture and are therefore suitable for use as supports for photographic prints and copies for which it is possible to avoid a considerable part of the washing process which normally has to be carried out in the treatment of prints and copies on supports made of paper.

DE-C 44 31 735 discloses the coating of barium sulfate particles with phosphorus pentoxide, aluminium oxide and silicon dioxide in order to achieve an excellent adhesion between the barium sulfate particles serving as filler and the polymer, so that the light scattering does not occur.

DE-A 22 46 818 provides a continuous process for the preparation of crystalline barium sulfate powder having an average particle size $d_{50}$>2 μm to 20 μm by precipitating barium sulfate from barium chloride solution using sulfuric acid, wherein the barium sulfate particles having the intended particle size are deposited in the outlet of the precipitation vessel and the smaller barium sulfate particles remain in the upper region of the precipitation vessel.

DE-A 36 35 050 provides a process for the continuous preparation of barium sulfate having a defined particle-size range, wherein barium sulfate is precipitated in a first step by the reaction of barium ions with sulfate ions. The suspension containing barium sulfate is withdrawn and transferred to a single-stage or multistage wet-grinding step, in which the grinding to the required particle-size range is carried out. The barium sulfate and mother liquor are subsequently separated.

The barium sulfate powder chemically precipitated by the known methods has an undesirable tendency to form agglomerates which prevent a homogeneous dispersion of the barium sulfate particles as white pigment and/or filler in the thermoplastics.

The object of the present invention is to provide barium sulfate precipitated by mixing of barium- and of sulfate-containing solution and, having an average particle diameter $d_{50}$ of from 0.1 to 10 μm; this barium sulphate is to show no tendency to form agglomerates and consequently is to have excellent properties as regards dispersibility and freedom from specks and is to produce an optimal film surface.

This object is achieved by covering the barium sulfate with at least one organic additive, the organic additive being selected from one or more of the substances or groups of substances: carboxylic acids, soaps, metallic soaps, alcohols; polyhydric alcohols, such as pentaerythritol, neopentyl glycol and trimethylolpropane; polyalcohols, such as polypropylene glycol and polyethylene glycol; organic esters, such as neopentyl glycol dibenzoate; silanes, siloxanes, silicone oils, organic sulfones corresponding to the formula $RSO_2R$, organic ketones (R—(C=O)—R), organic nitrites (RCN), organic sulfoxides ($R_2$—SO), organic amides (R—(C=O)—NR'R or R—(S=O)—ONR'R).

The organic additive content is from 0.1 to 30 wt.%, preferably from 0.1 to 10 wt. %, based on the content of barium sulfate.

The organic additives can be used in liquid or in solid form.

The barium sulfate particles can be covered with organic additive by a process for preparing barium sulfate having an average particle diameter $d_{50}$ of from 0.1 to 10 microns and precipitated by mixing of barium- and of sulfate-containing solution, characterized in that the separated filter cake is processed to form a paste, the paste is homogenously mixed with organic additive and then dried, the organic additive being selected from one or more of the substances or groups of substances: carboxylic acids, soaps, metallic soaps, alcohols, polyhydric alcohols such as pentaerythritol, neopentyl glycol and trimethylolpropane; polyalcohols such as propylene glycol and polyethylene glycol,; organic esters, such as neopentyl glycol dibenzoate; silanes, siloxanes, silicone oils, organic sulfones corresponding to the formula $RSO_2R$, organic ketones (R—(C=O)—R), organic nitriles (RCN), organic sulfoxides $R_2$—SO) or organic amides (R—(C=O)—NR'R or R—(S=O)—ONR'R). Another process relates to preparing barium sulfate having an average particle diameter $d_{50}$ of from 1 to 10 microns and precipitated by mixing of a barium-and of sulfate-containing solution, characterized in that the separated filter cake is dried and then homogeneously mixed with organic additive, the organic additive being selected from one or more of the substances or groups of substances: carboxylic acids, soaps, metallic soaps, alcohols, polyhydric alcohols, such as pentaerythritol, neopentyl glycol and trimethylolpropane; polyalcohols such as propylene glycol and polyethylene glycol,; organic esters, such as neopentyl glycol dibenzoate; silanes, siloxanes, silicone oils, organic sulfones corresponding to the formula $RSO_2R$, organic ketones (R—(C=O)—R), organic nitriles (RCN), organic sulfoxides ($R_2$—SO) or organic amides (R—(C=O)—NR'R or R—(S=O)—ONR'R). In other embodiments, the dry barium sulfate covered with organic additive is subjected to pulverization, preferably with an impact mill or jet mill. In other embodiments, the drying is carried out in a spray dryer or mill dryer. Preferably, the barium sulfate is precipitated by mixing of $BaCl_2$ solution or a $Ba(OH)_2$ solution with $Na_2SO_4$ solution or $H_2SO_4$.

To achieve an optimal distribution of liquid organic additives on the surface of the barium sulfate particles, the solution containing organic additive is sprayed onto the barium sulfate particles with an even-speed mixer, or the solution is added to a suspension of $BaSO_4$ and the mixture is homogenised by means of a dispersing apparatus.

When solid organic additives are used, first of all an aqueous or organic solution or suspension is prepared and is then sprayed onto the barium sulfate particles. In this way a very homogeneous distribution of the organic substances on the surfaces of the barium sulfate particles is achieved.

A particular advantage is that the barium sulfate particles aftertreated according to the invention render possible the preparation of masterbatches (pigment and filler concentrates) and compounds (mixtures) of thermoplastics in which the barium sulfate particles are so excellently dispersed that high-quality products can be made from them without special additional expense. The superior dispersibility in plastics of the barium sulfate particles aftertreated according to the invention is clearly shown by the fact that no specks arise in these plastics containing barium sulfate and the filter does not clog during a pressure filter test.

The barium sulfate particles according to the invention are suitable in particular for dispersion in plastics compositions, such as thermoplastics, thermosetting plastics and elastomers. The plastics thus treated are used in the production of fibres, coating materials, adhesives, films, film supports and the like.

The subject matter of the invention is explained in more detail by the following Examples.

First of all, a $BaSO_4$ suspension was prepared. For this purpose, an aqueous solution of $Na_2SO_4$ and an aqueous solution of $BaCl_2$ in a molar ratio of 1:0.98 were simultaneously introduced into a precipitation apparatus. The precipitation conditions were established as in the prior art, in such a way that the precipitated $BaSO_4$ in the aqueous solution had an average particle size $d_{50}$=0.52 μm. The precipitated $BaSO_4$ was then filtered and washed several times with deionised water. The filter cake obtained was dispersed in water. The suspension of barium sulfate had a solids content of approximately 250 g/l and was further processed in the following manner.

COMPARATIVE EXAMPLE A

A portion of the suspension was dried in a spray dryer. The $BaSO_4$ powder obtained had a $d_{50}$ of 0.52 μm and was used as a control (sample A).

EXAMPLE 1

1 wt. % (based on $BaSO_4$) of neopentyl glycol was added to a portion of the suspension, which was then dried as described in Comparison Example A. The white $BaSO_4$ powder obtained had a $d_{50}$ of 0.51 μm (sample 1) and a carbon content of 0.1 wt. %.

EXAMPLE 2

1 wt. % (based on $BaSO_4$) of 2,2-dihydroxymethyl-1-butanol was added to a portion of the suspension, which was then dried as described in Comparative Example A. The barium sulfate powder had a $d_{50}$ of 0.51 μm (sample 2) and a carbon content of 0.17 wt. %.

EXAMPLE 3

1 wt. % (based on $BaSO_4$) of polyethylene glycol 2000 was added to a portion of the suspension, which was then dried as described in Comparison Example A. The barium sulfate powder had a $d_{50}$ of 0.50 μm (sample 3) and a carbon content of 0.48 wt. %.

EXAMPLE 4

5 wt. % (based on $BaSO_4$) of polyethylene glycol 2000 was added to a portion of the suspension, which was then dried as described in Comparative Example A. The barium sulfate powder had a $d_{50}$ of 4.9 μm (sample 4) and a carbon content of 2.5 wt. %.

EXAMPLE 5

Preparation of Polyester Masterbatches, and their Properties

Samples A and 1 to 4 were extruded in a twin-screw extruder, with PETP (polyethylene terephthalate) in a mass ratio of 30:70 ($BaSO_4$:PETP) at a temperature of approximately 270° C. A 30% masterbatch was prepared in each case.

These masterbatches were subjected to a pressure filter test. During the filtration of the polymer melts through a screen pack (consisting of nozzle, seal, perforated plate, 14 μm screen with support screen), any pigment agglomerates and/or impurities which may be present bring about a build-up of pressure in front of the filter. This increase in pressure is a measure of the quality of the polymer melt. The lower the increase in pressure, the better is the pigment dispersed in the polymer.

The results of the pressure filter test are shown in Table 1.

TABLE 1

| Sample | A | 1 | 2 | 3 | 4 |
|---|---|---|---|---|---|
| Pressure filter value (bar × cm³/g), on a 14 μm screen after 60 min | 15.47 | 1.74 | 2.53 | 5.89 | 0.27 |

It can be seen from the Table that a $BaSO_4$ untreated with an organic substance (Comparison Example A) exhibits a very high pressure filter value. A comparison of untreated $BaSO_4$ with $BaSO_4$ treated according to the invention (samples 1 to 4) shows that the treated $BaSO_4$ can be dispersed significantly better and consequently contains little material (agglomerates) which adheres to filters and would result in a blockage of the filter.

EXAMPLE 6

Production of 18% Polyethylene Terephthalate Films (PETP Films)

The 30% masterbatch control A and the 30% masterbatch sample 1 (containing neopentyl glycol) according to the invention were diluted to a solids content of 18% and directly extruded to form films.

The PETP film produced using untreated $BaSO_4$ (sample A) contained clearly visible non-dispersible particles, which were present as agglomerates (so-called specks). In contrast, the PETP film produced using treated $BaSO_4$ (sample 1) contained scarcely any such specks, which is to be attributed to the considerably better dispersibility of the $BaSO_4$ treated according to the invention.

The invention claimed is:

1. A process comprising:
mixing a barium- and a sulfate-containing solution to form barium sulfate; filtering to recover a filter cake containing the barium sulfate; suspending the separated filter cake in water; mixing the suspension with at least one organic additive selected from the group consisting of an alcohol, a polyhydric alcohol, a polyalcohol, an organic ester, an organic sulfone; an organic ketone, an organic nitrile, an organic sulfoxide and an organic amide to form a mixed suspension; drying the mixed suspension; recovering barium sulfate covered with said organic additive, wherein said covered barium sulfate has an average particle diameter $d_{50}$ from 0.1 to 10 microns, and dispersing said covered barium sulfate in a plastic to form a plastic composition containing the coated barium sulfate, wherein the organic additive is an organic sulfone.

2. A process according to claim 1, wherein said drying step is conducted in a spray dryer or a mill dryer.

3. A process according to claim 1, wherein the covered barium sulfate is subjected to a pulverizing process.

4. A process according to claim 3, wherein said pulverizing process is conducted with an impact mill or a jet mill.

5. A process according to claim 1, wherein the barium sulfate is precipitated by mixing $BaCl_2$ solution with $Na_2SO_4$.

6. A process according to claim 1, wherein the organic additive content, based on the barium sulfate content, is 0.1 to 30 wt. %.

7. A process according to claim 6, wherein the barium sulfate is precipitated by mixing $BaCl_2$ solution with $Na_2SO_4$.

8. A process according to claim 1, wherein the organic additive content, based on the barium sulfate content, is 0.1 to 10 wt. %.

9. A process according to claim 8, wherein the covered barium sulfate is subjected to a pulverizing process.

10. A process according to claim 9, wherein said pulverizing process is conducted with an impact mill or jet mill.

11. A process according to claim 10, wherein the barium sulfate is precipitated by mixing $BaCl_2$ solution with $Na_2SO_4$.

12. A process according to claim 1, wherein said polyalcohol is selected from the group consisting of polypropylene glycol and polyethylene glycol.

13. A process according to claim 1, wherein said organic ester is neopentyl glycol dibenzoate.

14. A method according to claim 1, wherein said polyalcohol is polypropylene glycol.

15. A method according to claim 1, wherein said polyhydric alcohol is polyethylene glycol.

16. A process comprising:
mixing a barium- and a sulfate-containing solution to form barium sulfate; filtering to recover a filter cake containing the barium sulfate; suspending the separated filter cake in water; mixing the suspension with an organic ketone, to form a mixed suspension; drying the mixed suspension; and recovering barium sulfate covered with said organic additive, wherein said covered barium sulfate has an average particle diameter $d_{50}$ from 0.1 to 10 microns, and dispersing said covered barium sulfate in a plastic to form a plastic composition containing the coated barium sulfate.

17. A process comprising:
mixing a barium- and a sulfate-containing solution to form barium sulfate; filtering to recover a filter cake containing the barium sulfate; suspending the separated filter cake in water; mixing the suspension with an organic sulfoxide to form a mixed suspension; drying the mixed suspension; and recovering barium sulfate covered with said organic additive, wherein said covered barium sulfate has an average particle diameter $d_{50}$ from 0.1 to 10 microns, and dispersing said covered barium sulfate in a plastic to form a plastic composition containing the coated barium sulfate.

18. A process comprising:
mixing a barium- and a sulfate-containing solution to form barium sulfate; filtering to recover a filter cake containing the barium sulfate; suspending the separated filter cake in water; mixing the suspension with an organic ketone to form a mixed suspension; drying the mixed suspension; and recovering barium sulfate covered with said organic additive, and dispersing said covered barium sulfate in a plastic to form a plastic composition containing the coated barium sulfate.

19. A process comprising:
mixing a barium- and a sulfate-containing solution to form barium sulfate; filtering to recover a filter cake containing the barium sulfate; suspending the separated filter cake in water; mixing the suspension with an organic sulfoxide to form a mixed suspension; drying the mixed suspension; and recovering barium sulfate covered with said organic additive, and dispersing said covered barium sulfate in a plastic to form a plastic composition containing the coated barium sulfate.

20. A process according to claim 19, wherein the barium sulfate is precipitated by mixing $BaCl_2$ solution with $Na_2SO_4$.

* * * * *